June 21, 1966  R. M. WEIGEL  3,257,594
BRUSHLESS DIRECT CURRENT POWER UNIT
Filed March 19, 1963  2 Sheets-Sheet 1
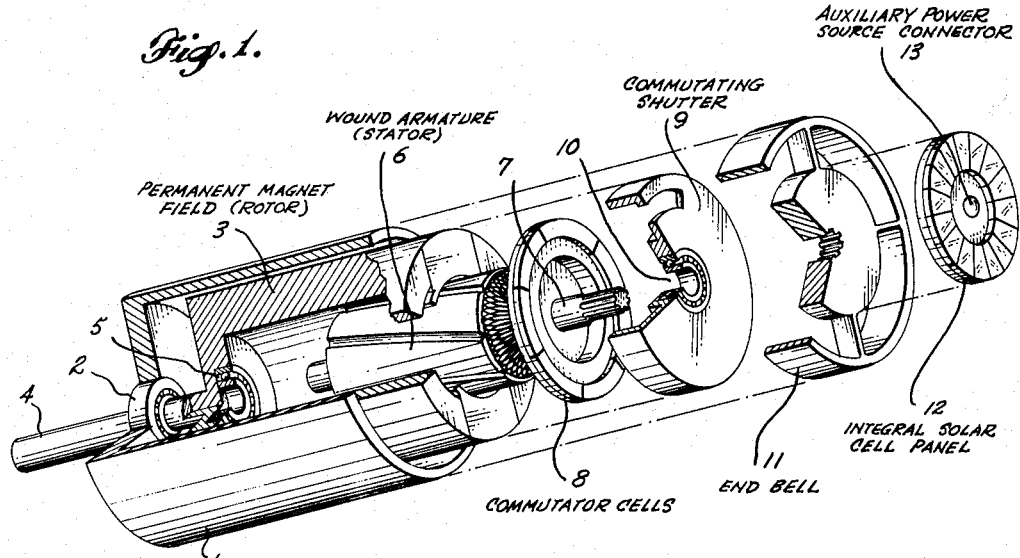
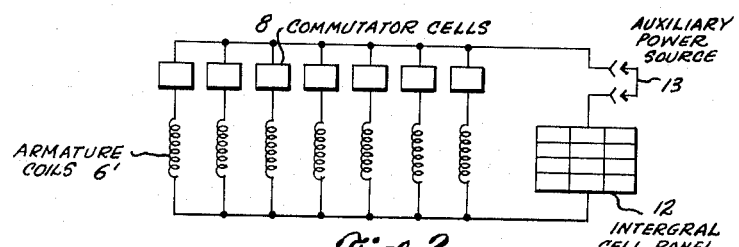
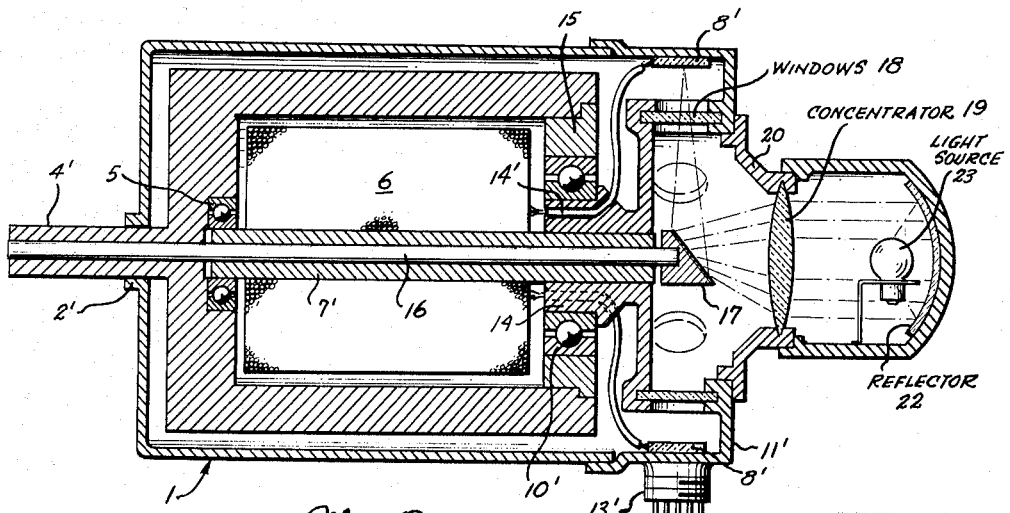
INVENTOR.
ROBERT M. WEIGEL
BY
L E Carnahan
AGENT June 21, 1966 R. M. WEIGEL 3,257,594
BRUSHLESS DIRECT CURRENT POWER UNIT
Filed March 19, 1963 2 Sheets-Sheet 2
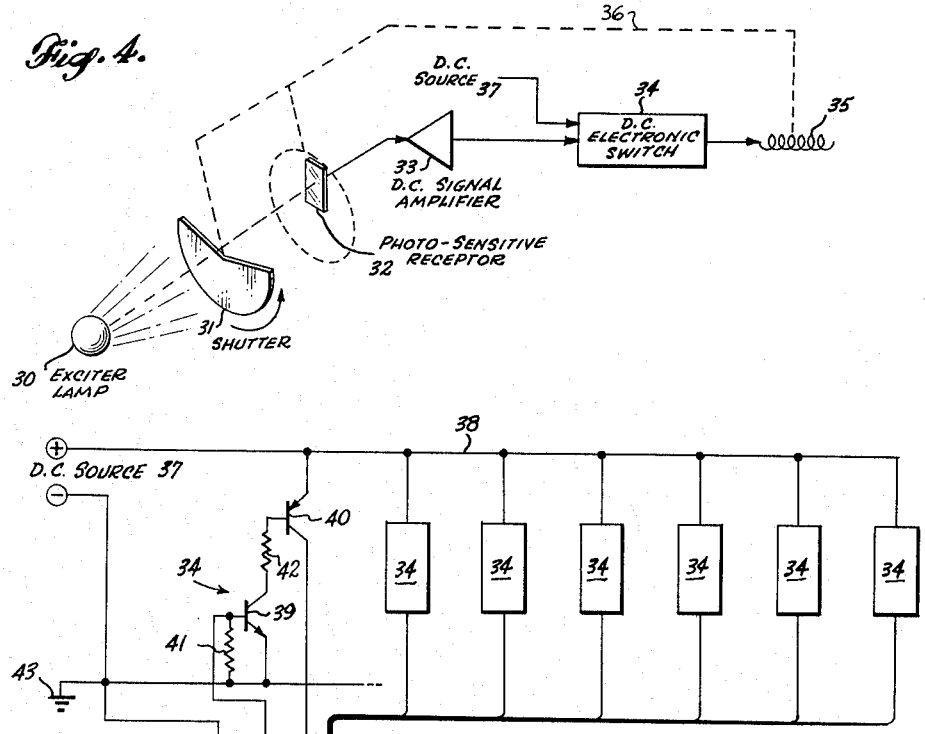
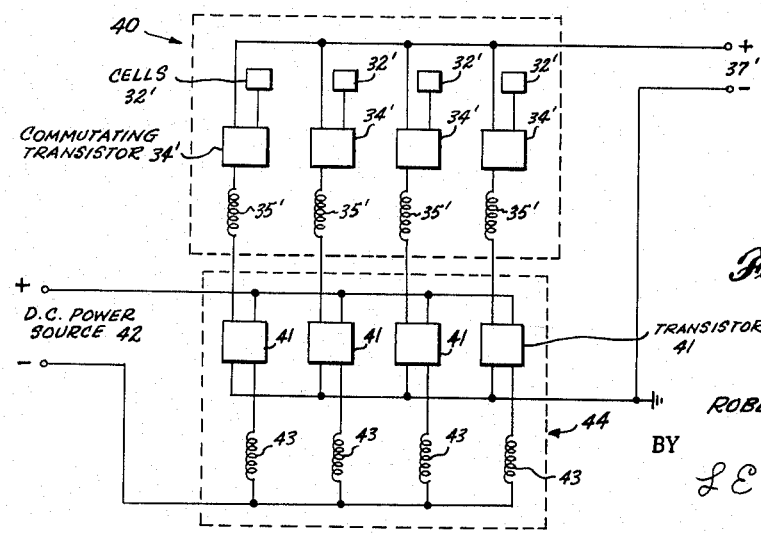
INVENTOR.
ROBERT M. WEIGEL
BY
L E Carnahan
AGENT

United States Patent Office 3,257,594
Patented June 21, 1966

3,257,594
BRUSHLESS DIRECT CURRENT POWER UNIT
Robert M. Weigel, Seattle, Wash., assignor to The Boeing Company, Seattle, Wash., a corporation of Delaware
Filed Mar. 19, 1963, Ser. No. 266,339
4 Claims. (Cl. 318—138)

This invention relates to the conversion of radiant energy into electromechanical energy and to the use of radiant energy to control conversion of electrical energy to electromechanical energy, and more particularly to the conversion of radiant energy to power or to control energy for powering a unit which functions as a controller of larger motors, as a medium of motion control of equipment in satellites, or as a simple motor to be used in numerous ways.

It is well known that certain devices, when excited by radiant energy, convert a part of this radiant energy into electrical energy. The high frequency of radiant energy relative to that of mechanical motions makes mechanical application of such energy convenient through conversion into unidirectional electrical energy. With the exception of U.S. Patent No. 2,919,358 to W. A. Marrison, prior known mechanical utilization of this radiant energy phenomenon has been burdened by the relative delicacy of conventional commutators with their resultant high manufacturing costs, troublesome maintenance problems, radio noise generation, and difficulty in handling relatively higher voltages.

As a consequence, electroemission by radiantly excited sources has been employed primarily to control relay type switches, which, in turn, control other power supplies, ultimately to provide controlled mechanical energy. Such systems contain many parts, several of which move in contact with others. These moving parts must suffer in varying degrees from mechanical unreliability and a multiplicity of parts makes for high costs. Further, the very nature of an on-off mechanism, as is the relay, makes its ability to control either course and subject to hunting or unduly complicated by feedback loops.

The instant invention is basically directed to a power unit operable directly from a radiant energized electricity producing or conducting device without intermediate energy storage. The utility of the unit is enhanced by its capability of operating from a storage device in absence of natural light or from both sources. More specifically, the unit is self-timed (commutated) in a manner to cause rotation by sequentially illuminating appropriate photosensitive cells rather than by conventional brushes because:

(1) Brushes absorb relatively large amounts of mechanical power, and in a flea power (low horsepower) unit can easily reduce mechanical efficiency;
(2) Brushes require maintenance;
(3) Brushes are a source of radio and power line noise;
(4) The electrical efficiency of brushes is poor; and
(5) Atmospheric conditions, especially those resulting in contamination of the contacting surfaces, affect brush performance. This leads to a vicious circle: as contact pressures are increased to raise electrical efficiency, mechanical efficiency plummets.

In addition to being brushless, the instant power unit contains, within itself, its own magnetic field, rotor, commutating means, and power source. It will, upon exposure to light, start and rotate without external mechanical or electrical assistance, thus converting radiant energy directly into rotary motion.

In addition to the features set forth above, the instant invention provides a photo-sensitive commutated brushless direct current power unit for applications where brush arcing is detrimental to enclosed atmospheres and/or where brush arcing creates electrical interferences with radio communications e.g., satellites, sonar equipment in submarines.

Therefore, an object of this invention is to provide a simple, reliable means for converting radiant energy into electro-mechanical energy.

A further object of the invention is to provide a simple, reliable means whereby a radiant energy source may serve as its own control source.

A still further object of the invention is to provide radiant energy sensitive commutating means for a direct current power unit.

Another object of the invention is to provide a brushless direct current power unit which will start and rotate without external mechanical or electrical assistance.

Another object of the invention is to provide a brushless power unit which contains its own magnetic field, rotor, commutating means, and power source.

Another object of the invention is to provide photo-sensitive means for triggering a transistor commutated power unit.

Another object of the invention is to provide a radiant energy actuated power unit for commutating and controlling large brushless motors.

Another object of the invention is to provide a power unit energized by radiant energy which has the capacity to operate from a storage device in absence of natural light.

Another object of the invention is to provide a power unit which utilizes a portion of the mechanical energy derived from an electromechanical converter means to cause sequential illumination of photo-senstive surfaces thus controlling the electrical energy supplied to the electromechanical converter means.

Another object of the invention is to provide a radiant energized power unit which functions in combination with transistors to operate as a controlling mechanism.

Another object of the invention is to provide a power unit which is commutated by photo-sensitive cells and transistor mechanisms.

Another object of the invention is to provide a power unit that can be varied by controlling the amount of radiant energy supplied thereto.

Other objects of the invention not specifically set forth above will become readily apparent from the accompanying description and drawing in which:

FIG. 1 is an exploded view of one embodiment of the invention;
FIG. 2 schematically shows the electric circuit of the FIG. 1 device;
FIG. 3 shows another embodiment of the invention with certain elements being shown in cross-section;
FIG. 4 schematically shows another embodiment of the invention;
FIG. 5 schematically shows the electrical circuitry of the FIG. 4 embodiment, and
FIG. 6 schematically shows the electrical circuitry of the power unit when utilized as a commutator and controller for a large brushless D.C. motor.

Two general classes of power units preferable for brushless design are:
(1) Permanent magnet field direct current; and
(2) Polyphase alternating current with squirrel cage rotor.

Either of these types may be constructed "inside out," i.e., stationary inner element; rotating outer element.

In each case the unit is commutated or supplied a field by sequentially activating appropriate photo-sensitive cells or transistor means triggered by photo-sensitive cells.

The instant invention is directed to a brushless power unit of the permanent magnet field direct current type, its configuration being mechanically "inside out": a wound armature is stationary; the field rotates, its size being small to permit easy handling and transport.

The power unit embodiments of the instant invention provide the following advantageous features:

(1) It gives sure starting with no extra complication or sacrifice of efficiency;

(2) It gives reasonable efficiency, sure starting and demonstrable torque as well as high speeds at varying tungsten and solar light levels;

(3) Its operating principle is simple and is easily understood by persons only vaguely familiar with motor design;

(4) It will permit a high moment of inertia to demonstrate its gyroscope possibilities;

(5) It permits, in one package, demonstration of its ability to function as an entirely self-contained motor (including its power panel) and its equal ability to function from a remote panel. This allows then, connection to a larger remote panel for greater power;

(6) It may set up to permit solar energy charged storage battery operation, this being of importance for utilization in space vehicles;

(7) It provides a simple and efficient control mechanism for large brushless type motors;

(8) It may be set up to commutate transistors to control direct current power to large motors;

(9) It utilizes a portion of the mechanical energy derived from an electromechanical converter to vary the incidence upon an electrically responsive surface of the radiant energy from which the converter derives its driving electrical energy;

(10) It provides stable operation despite environmental changes.

(11) It can be turned on, off, reversed, and speed controlled without switches or potentiometers; and

(12) It can utilize high direct current voltage without arcing problems.

Referring now to the drawings, FIG. 1 shows a power unit having a casing 1 which is affixed rigidly in any desired manner. Pressed into the closed end of casing 1 is a ball bearing 2 which supports rotating permanent magnet 3 by output shaft 4, said output shaft 4 extends through said bearing 2 and is attached to rotating magnet 3. Permanent magnet 3 is provided with a ball bearing 5, said bearing 5 aligning with bearing 2 and output shaft 4 and providing support for wound armature 6 via shaft 7 which is positioned in a hollow portion of magnet 3, said armature being wound with a plurality of coils 6' (see FIG. 2). Attached to shaft 7 of armature 6 is a panel of commutator photo-sensitive cells 8, in this instance there being seven (7) cells in the panel. A commutating shutter 9 is rotatably mounted in ball bearing 10 on shaft 7 and attached to permanent magnet 3 thus rotating with magnet 3 and chops the light over cells 8 to synchronize the unit's rotation. An end bell 11 is slipped over a splined end of armature shaft 7 and pressed over casing 1 thus holding armature 6 stationary as well as holding the unit together. In this form, a power unit is provided which has within itself power, commutating means affording exacting synchronization, force field and a rotating output shaft. When exposed to solar radiation or artificial light this unit, without external assistance of any kind and without brushes, will start itself and obtain an r.p.m. in proportion to the input energy absorbed.

In order to control the power unit and to have it operational in the absence of light, an external tap must be provided. FIG. 1 shows an additional energy source such as solar cell panel 12 integrally attached to end bell 11. Located on panel 12 is an auxiliary power source connector or tap 13 for additional power or control signals. By adding panel 12 or by connecting the center tap 13 to an outside signal source, such as a storage battery, unit behavior can be influenced as desired.

The permanent magnet field carrying shutter 9 is free to rotate mechanically about wound stator (armature) 6 which carries at least one photo-sensitive cell per coil. The shutter's position with respect to the field poles is adjusted to illuminate at the proper electrical angle (with light incident on the motor face) one or more commutator cells 8 in which turn energize their respective armature coils for reaction with the field flux. The field assembly (magnet 3), then, rotates about the armature to deliver power via output shaft 4.

The wiring diagram of the FIG. 1 power unit is shown in FIG. 2 wherein corresponding reference numerals indicate the same elements and further explanation is deemed unnecessary.

The circuit shown in FIG. 2 can be modified, if desired, by elimination of cell panel 12 and directing the output of a pair of commutator cells 8 through a single coil 6'. In the instant case of 7 commutator cells, only four (4) coils 6' would be required, one of said coils receiving current from only one cell. Power from an auxiliary source as indicated by legend in FIG. 2 would be connected to tap 13 for operation as described above.

The FIG. 3 embodiment utilizes a stationary armature and rotating permanent magnet as in the FIG. 1 device and like elements are given the same reference numerals. However, the control mechanism for shuttering the cells functions in a different manner.

Referring now to the details of the FIG. 3 embodiment, the power unit comprises a stationary casing 1, a permanent magnet 3 rotatably mounted in casing 1 on bearing surface 2', said magnet 3 having an output shaft 4' integrally connected therewith, said bearing surface 2' can be modified to include a roller type bearing as in the FIG. 1 device, if desired. Armature 6 is fixedly attached to shaft 7' which is supported in bearing means 5 at one end thereof and attached at the other end to a cantilevered portion of end bell means 11' which is fixedly attached to stationary casing 1, thus maintaining armature 6, shaft 7' and end bell means 11' in a stationary position as in the FIG. 1 embodiment.

The cantilevered portion of end bell 11' includes a collar 14, said collar 14 having passageways 14' bored therethrough for interconnecting windings on armature 6 with a plurality of photo-sensitive cells 8' mounted on stationary end bell 11'. An additional power source is connected with the power unit as in the FIG. 1 embodiment at 13'.

Permanent magnet 3 is provided with an insert portion 15 which is supported via bearing means 10' on collar 14 of end bell 11' thus providing bearing support for magnets 3 at 2' and 10'.

Stationary shaft 7' is hollow to accommodate shaft 16 which is attached at one end to output shaft 4' to rotate therewith. Attached to the other end of shaft 16 is prism or mirror means 17 the function of which will be described hereinafter.

End bell 11' is provided with a plurality of window means 18 to allow energy to be transmitted from means 17 to cells 8'. Window means 18 may, if desired, be covered with transparent material.

A concentrator 19 is positioned in alignment with mirror means 17 by mounting means 20 which is attached to end ball 11'. Mounted on mounting means 20 is an end cap 21, said end cap having a reflector 22 attached thereto. A light source 23 is mounted in said end cap 21 between concentrator 19 and reflector 22. Light source 23 may be of a self-contained type or connected to an external power source by appropriate connector means (not shown).

If it is desired to utilize solar energy in the FIG. 3 device, end cap 21 would be removed whereby solar energy would be directed onto mirror means 17 by concentrator 19.

The FIG. 3 embodiment operates on the same principle as the FIG. 1 device except that the energy is concentrated via concentrator 19, mirror means 17 and a window 18 on the cell or cells 8' that is operatively associated with the window, thus providing greater efficiency of the unit.

While each of the FIG. 1 and 3 embodiments have been described as having a rotating magnet and stationary armature, the invention encompasses the use of a fixed magnet and rotating armature with the armature positioned within the magnet or vice-versa.

The FIGS. 4 and 5 embodiment of the invention is constructed similar to the FIG. 1 embodiment except that the photo-sensitive cells function to switch transistor units which control an external energy source for energizing the power unit.

As shown schematically in FIG. 4, this embodiment comprises an exciter light source or lamp 30, a shutter 31, photo-sensitive receptor or cell 32, signal amplifier 33, D.C. electronic switch or transistor generally indicated at 34, and coil 35; coil 35 being interconnected electrically with cell 32 and producing mechanical energy as in the FIG. 1 embodiment which rotates shutter 31, each of these interconnections with coil 35 being indicated by the dash line 36. An external D.C. energy source 37 is operatively connected with transistor 34. The signal amplifier 33 may be omitted when a photosensitive cell 32 or arrangement of cells of sufficient output to drive transistor 34 directly is utilized.

For clarification FIG. 4 shows interrelationship of a single cell and coil unit while the embodiment, as shown in more detail in FIG. 5, utilizies a system wherein each of the elements are multiplied by the number of coils used except for the lamp and shutter elements which are common to each of the cells, transistors, and coils of the system. As in the FIG. 1 embodiment, and as shown in FIG. 5, this embodiment utilizes seven (7) cells 32 and coils 35.

Referring now to FIG. 5, D.C. source 37 supplies electrical energy to each of the transistors 34 by conduit means 38, only one transistor 34 being shown in detail. Transistors 34 each comprises two stages of transistors but has been shown generally as a single transistor. Each of transistors 34 comprises a first and second switch elements 39 and 40, and first and second resistor elements 41 and 42, the operation and interconnection thereof being described hereinafter.

Operatively connected with the switch element 40 of each transistor 34 is a coil 35, which in this embodiment is wound on the armature as described above with respect to FIGS. 1 and 2 and connected to ground 43 to complete the circuit. For clarity only one coil 35 and its connections have been shown. However, each of the transistors and coils in the system are interconnected in the same manner as the one shown.

Resistor 42 is operatively connected between switch elements 39 and 40 while resistor 41 is connected between switch element 39 and ground 43. Switch element 39 is operatively connected to ground 43 and to photosensitive cell 32, said cell 32 being connected to ground 43. While not shown, there is a cell 32 for each transistor 34. In this embodiment cells 32 are of the photo-voltaic type.

The FIGS. 4 and 5 embodiment operates as follows: electrical energy from source 37 is directed through conduit means 38 to transistors 34. The current flows through switch element 40, resistor 42 and switch element 39 of each transistor 34 to cell 32. When no light source is present there is no current flow through cell 32 thus forcing flow through resistor 41 to ground, whereby the power unit is not activated. Upon directing light onto one of cells 32 current flows therethrough to ground 43 thus causing sufficient current flow through the system to activate switch 39 which passes current to ground 43 causing increased current flow through resistor 42 which activates switch 40 and directs current from source 37 to power coil 35. Coil 35 cooperates with its associated field to rotate the output shaft of the power unit and rotate shutter 31 which directs the light source to the next cell 32 thus activating that cell's associated transistor 34 and coil 35 and deactivating the first cell and its associated transistor and coil, whereby this operation is repeated from one cell to the other causing continuous rotation of the output shaft for mechanical power production. The time period of activation and deactivation of each of the cells 32 is determined by the rotation of shutter 31, thus two (2) or more adjacent cells and their associated transistors and coils may be activated at the same time.

While the FIG. 5 embodiment shows a unit having two stages of transistors, the power unit can be effectively operated by a single stage of transistors, if desired.

While the transistors 34 of the FIGS. 4 and 5 embodiment are triggered by photo-generating cells, the required voltage to trigger these transistors can be built up with minimal illumination levels and/or to higher triggering voltage requirements by using cells in series relationship. For example if the triggering voltage required is 1½ volts and the cells produce ½ volt under the expected illumination, the 1½ volts can be produced by using 3 cells connected in series at each cell location, thus providing an alternative means for the two stages of transistors utilized in FIG. 5 to amplify the voltage from one cell to the required triggering voltage.

Similarly, separate energy, as from a battery, can be used to trigger the transistors, the energy being commutated by photo-conductive cells. The cells can be used in series or parallel or combination hookups to provide sufficient voltage and/or current conducting capacity to directly trigger the transistors feeding the coils of the power unit, thereby eliminating a possible need for more than one stage of transistors.

The power unit shown in FIG. 6 and generally indicated at 40 functions in substantially the same manner as the FIGS. 4 and 5 embodiment except that a portion of the electrical energy is tapped from each of the coil windings 35', as they are activated by their respective cells 32' and transistors 34', and directed to transistors 41 which function to commutate electrical energy flowing from D.C. power source 42 to coils 43 which cooperate with the field of large motor 44 to produce mechanical power in the conventional manner. The light directed to cells 32' of unit 40 controls the motor 44. The rate of sequential illumination of cells 32' will accordingly vary the speed of motor 44 thus providing an effective remote control system for D.C. brushless motors.

While the description has been directed to wound armature type units, the principle of the invention can be effectively applied to motors utilizing printed circuitry, whereby, photo-sensitive elements function as a source of power and/or as a commutator for this type motor.

The power unit of the instant invention will function as a generator when driven by a prime mover, this reverse function being well known in the art of electric power units.

In addition to the features set forth above, the instant invention serves as a self powered pulse generator when functioning in a manner similar to that described with respect to the FIG. 6 embodiment wherein a pulse tapped from coils 35' can be directed to other uses and when photo-sensitive elements 32' are of the electrical generating type.

It has thus been shown that the instant invention provides a small compact and powerful source of output energy which utilizes radiant energy for commutation thereof and can additionally function as a remote controller for large direct current brushless motors.

Although particular embodiments of the invention have been illustrated and described, it will be obvious to those skilled in the art that various changes and modifications may be made without departing from the invention, and it

What I claim is:

1. Control mechanism for a brushless direct current motor having a plurality of windings comprising:
   (a) a supply source;
   (b) a motor having a wound armature rotor and a magnetic stator;
   (c) means for commutating the electrical energy from said source to said armature windings;
   (d) photo-sensitive means for controlling said commutating means;
   (e) means for sequentially illuminating said photo-sensitive means responsive to rotation of said motor;
   (f) circuit means interconnecting the wound armature of said motor with said plurality of windings of said brushless direct current motor; and
   (g) second means for commutating electrical energy from a second source to said brushless direct current motor, said second means responsive to current flow in said circuit means.

2. The control mechanism of claim 1 wherein said first and said second commutating means includes a plurality of transistors.

3. The control mechanism of claim 1 wherein said means for sequentially illuminating said photo-sensitive means comprises a shutter having an arcuate slot and fixedly mounted to said rotor, said shutter being positioned relative to said photo-sensitive means so that the arcuate slot in said shutter sequentially exposes said photo-sensitive means to a light source.

4. The control mechanism of claim 1 wherein said means for sequentially illuminating said photo-sensitive means comprises:
   (a) a shaft;
   (b) a light source;
   (c) a reflective surface mounted on the end of said shaft adjacent to said light source and disposed so as to direct radiant energy from said light source onto said photo-sensitive means; and
   (d) means for concentrating the radiant energy of said light source onto said reflective surface.

References Cited by the Examiner

UNITED STATES PATENTS

| | | | |
|---|---|---|---|
| 2,919,358 | 12/1959 | Marrison | 318—480 X |
| 3,023,348 | 2/1962 | Cox | 318—480 X |
| 3,096,467 | 7/1963 | Angus | 318—480 X |

ORIS L. RADER, *Primary Examiner.*

C. E. ROHRER, G. Z. RUBINSON,
*Assistant Examiners.*